United States Patent
Xu et al.

(10) Patent No.: US 6,887,456 B2
(45) Date of Patent: May 3, 2005

(54) CATALYST SYSTEM FOR ENHANCED FLOW SYNGAS PRODUCTION

(75) Inventors: Bang Chen Xu, Houston, TX (US); Sriram Ramani, Ponca City, OK (US); Kevin L. Ricketson, Ponca City, OK (US); Gloria I. Straguzzi, Ponca City, OK (US); Larry D. Swinney, Stillwater, OK (US); Joe D. Allison, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 217 days.

(21) Appl. No.: 10/264,554

(22) Filed: Oct. 4, 2002

(65) Prior Publication Data

US 2003/0083198 A1 May 1, 2003

Related U.S. Application Data

(60) Provisional application No. 60/327,479, filed on Oct. 5, 2001.

(51) Int. Cl.$^7$ .............................................. C01B 3/26
(52) U.S. Cl. ..................... 423/651; 48/198.7; 252/373
(58) Field of Search ..................... 48/98.7; 252/373; 423/651

(56) References Cited

U.S. PATENT DOCUMENTS

| | | | |
|---|---|---|---|
| 5,510,056 A | 4/1996 | Jacobs et al. | 252/373 |
| 5,648,582 A | 7/1997 | Schmidt et al. | 585/652 |
| 5,654,491 A | 8/1997 | Goetsch et al. | 568/469.9 |
| 6,254,807 B1 | 7/2001 | Schmidt et al. | 252/373 |
| 6,409,940 B1 | 6/2002 | Gaffney et al. | 252/373 |

FOREIGN PATENT DOCUMENTS

| | | | |
|---|---|---|---|
| WO | WO97/29835 | 8/1997 | B01D/53/86 |
| WO | WO99/35082 | 7/1999 | C01B/3/38 |

OTHER PUBLICATIONS

D.A. Hickman and L.D. Schmidt, *Synthesis Gas Formation By Direct Oxidation of Methane Over PT Monoliths*, J. Catalysis (1992) 267–282.

K.L. Hohn, L.D. Schmidt, *Partial Oxidation of Methane to Syngas At High Space Velocities Over Rh–Coated Spheres*, Applied Catalysis A: General 211 (2001) 53–68.

A. Cybulski and J.A. Moulijn (Eds.), Structured Catalysts and Reactors, Marcel Dekker, Inc. (Ch. 7, Gerald E. Voecks, *Unconventional Utilization of Monolithic Catalysts for Gas–Phase Reactions*) (1998) 179–208.

A. Cybulski and J.A. Moulijn (Eds.), Structured Catalysts and Reactors, Marcel Dekker, Inc. (Ch. 21, X. Xu and J.A. Moulijn, *Transformation of a Structured Carrier into Structured Catalyst*) (1998) 599–615.

PCT/US02/32026, International Filing Date: Oct. 7, 2002 date of mailing Feb. 14, 2003.

Primary Examiner—Stanley S. Silverman
Assistant Examiner—Maribel Medina
(74) Attorney, Agent, or Firm—Conley Rose P.C.

(57) ABSTRACT

A method and apparatus for converting a hydrocarbon and oxygen containing gas feed stream to a product stream, such as syngas, including catalytically partially oxidizing the hydrocarbon feed stream over a catalyst bed. The catalyst bed has a downstream section which is less resistant to flow than the upstream section.

37 Claims, 2 Drawing Sheets

CATALYST SYSTEM FOR ENHANCED FLOW SYNGAS PRODUCTION

CROSS REFERENCE TO RELATED APPLICATIONS

The present application claims priority to U.S. Provisional Application No. 60/327,479, filed Oct. 5, 2001 incorporated herein by reference.

STATEMENT REGARDING FEDERALLY SPONSORED RESEARCH

Not applicable.

FIELD OF THE INVENTION

The present invention generally relates to apparatus and methods for the production of synthesis gas, a mixture of primarily CO and $H_2$. Particularly, the present invention relates to optimizing the production of synthesis gas by controlling the properties of the catalyst bed. More particularly, the present invention relates to optimizing the production of synthesis gas by controlling the flow resistance and length of the catalyst bed and the pressure drop across the bed.

BACKGROUND OF THE INVENTION

Large quantities of natural gas, comprising mostly methane, are available in many areas of the world, and natural gas is predicted to outlast oil reserves by a significant margin. However, most natural gas is situated in areas that are geographically remote from population and industrial centers. The costs of compression, transportation, and storage make the use of this remote natural gas economically unattractive in most instances. To improve the economics of natural gas use, much research has focused on methane as a starting material for the production of higher hydrocarbons. The conversion of methane to hydrocarbons is typically carried out in two steps. In the first step, methane is reacted to produce carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes.

Current industrial use of methane as a chemical feedstock proceeds by the initial conversion of methane to carbon monoxide and hydrogen by either steam reforming, dry reforming (also called $CO_2$ reforming), or partial oxidation. Steam reforming is the major process used commercially for the, conversion of methane to synthesis gas and proceeds by the strongly endothermic reaction shown in Equation 1.

$$CH_4 + H_2O \leftrightharpoons CO + 3H_2 \qquad (1)$$

Dry reforming, also endothermic, proceeds according to the reaction of Equation 2.

$$CH_4 + CO_2 \leftrightharpoons 2CO + 2H_2 \qquad (2)$$

These two processes require the input of appreciable quantities of heat to initiate and maintain the reaction, and thus, require equipment to provide that heat. Although steam reforming has been widely practiced for over five decades, efforts to improve the energy efficiency and reduce the capital investment required for this technology continue.

In contrast, the partial oxidation of methane and other hydrocarbons is exothermic, and under ideal conditions can proceed according to the stoichiometry of Equation 3 to yield a syngas mixture with an $H_2$:CO ratio of 2:1.

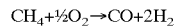

$$CH_4 + \tfrac{1}{2}O_2 \rightarrow CO + 2H_2 \qquad (3)$$

This ratio mixture is in many instances more useful than the $H_2$:CO ratio from steam reforming for such downstream operations as the conversion of the syngas to chemicals such as methanol and to fuels.

Another advantage of utilizing partial oxidation processes for syngas production is that oxidation reactions are typically much faster than reforming reactions, and therefore, allow the use of much smaller reactors.

In order to avoid extreme conditions, various catalyst systems have been employed to catalyze the partial oxidation of hydrocarbons such as methane. In a typical catalytic partial oxidation process, the hydrocarbon feed is mixed with air, oxygen-enriched air, or oxygen, and introduced to a catalyst at elevated temperature and pressure. The resulting product is primarily CO and $H_2$. The product may also contain unreacted methane as well as other compounds such as $H_2O$, $CO_2$, and $C_2H_4$ which are products of secondary reactions. It may be preferable to increase the methane conversion and remove or reduce these secondary products.

It has been suggested that in catalytic partial oxidation bed, that the partial oxidation occurs in the first millimeter of bed length. See Hickman and Schmidt, SYNTHESIS GAS FORMATION BY DIRECT OXIDATION OF METHANE OVER PT MONOLITHS, 138 J. Catalysis 267, 275 (1992). Thus, because it is thought that only a small portion of the catalyst bed is needed to catalyze the reaction, it should logically follow that catalyst beds longer than 1 mm would waste expensive catalyst and reactor space. Additionally, in some instances, longer catalyst beds are undesirable because it is difficult or impossible to maintain high gas hourly space velocities and short contact times.

Although the above described methods of syngas production demonstrate significant advancements, there is a continuing need for better processes for the catalytic partial oxidation of hydrocarbons which produce a higher conversion of reactant gases and higher selectivity of CO and $H_2$ reaction products (i.e., fewer secondary reaction products) and which are capable of operating at superatmospheric pressures without creating an undesirably large pressure drop across the catalyst bed.

SUMMARY OF THE INVENTION

Accordingly, there is provided herein a catalyst system which increases the conversion and selectivity of the catalytic partial oxidation of hydrocarbons to the desired products, such as syngas, and increases the overall methane conversion without creating an undesirably large pressure drop across the catalyst bed. We have discovered that increasing the length of the catalyst bed gives higher hydrocarbon conversion, higher syngas selectivities, more stable operation, and less coking.

The catalyst system is capable of operating at elevated pressure to provide high space velocities, which is particularly desirable in short contact time catalytic partial oxidation reactors like those used for the production of synthesis gas from gaseous light hydrocarbons.

One embodiment of the present invention generally includes at least two serially aligned stacked zones, each zone containing a syngas catalyst supported on a catalyst support. The second of the serially aligned zones generally has a flow resistance less than the flow resistance of the first of the serially aligned zones.

The catalyst supports are each made of a material which may include, without limitation, woven wire gauze, particulates, granules, powders, rings, extrudates, pills, foam monoliths with uniform or non-uniform pore size and pore distribution, honeycomb monoliths having uniform or non-uniform channels, substantially spherical, substantially oblong, substantially polyhedral, or substantially cylindrical pellets, or any other acceptable catalyst support in any acceptable manufactured shape as in known in the art. The catalyst support preferably comprises partially stabilized zirconia (such as magnesium stabilized zirconia, zirconia stabilized alumina, yttrium stabilized zirconia, or calcium stabilized zirconia), alumina, cordierite, zirconia, titania, silica, or silicon carbide, or any combination of these materials.

Other embodiments also include a catalyst support with a flow resistance gradient wherein the flow resistance of the support decreases from the catalyst system's upstream end to its downstream end. The flow resistance gradient may be a smooth gradient or a gradient achieved by a series of small decreases in flow resistance. The flow resistance gradient may be, but is not necessarily, uniform.

Another embodiment also includes a catalyst system in which in addition to the porosity variations, the catalyst composition may be varied to optimize the reaction in the particular location in the catalyst system. Typically, the catalyst comprises an active metal selected from the group consisting of Rh, Pt, Pd, Ru, Lr, Re, Ni, Co, Fe, Mn, Cr, Mg, Ca, Y, La, Ce, Sm, Yb, Pr, and combinations thereof. Preferably, the catalyst comprises at least one metal from Group VIII, more preferably rhodium or nickel. In addition, the composition of the catalyst can be the same throughout the bed, or can vary from one end to the other end.

A further embodiment includes a catalyst system for catalyzing the net partial oxidation of a feed stream comprising a hydrocarbon and an oxygen containing gas to produce a product gas, such as syngas, under reaction promoting conditions when the catalyst system is employed in a fixed bed. The catalyst system includes at least two zones in a stacked serial flow arrangement, where the first zone has a greater resistance to flow than a subsequent zone. The catalyst zones may comprise channeled monoliths wherein the channels in the subsequent zone have larger average channel diameters than the channels in the first zone. The subsequent zone channels are preferably at least 20% larger. The monolith is preferably at least about ⅛ inch long.

In another preferred embodiment, the channel density of the subsequent zone is at least 5% greater than the channel density of the first zone.

In yet another preferred embodiment, the resistance to flow of the first zone is at least 5% greater than the resistance to flow of the final reaction zone.

Without wishing to be bound by a particular theory, Applicants believe that the reason the current catalyst systems, in which a more flow resistant catalyst zone is followed by a less flow resistant catalyst zone, are at least almost as effective as the same length catalyst system without the corresponding flow resistance difference is that the majority of the undesirable secondary reactions take place in the interstices between the catalyst particles or the voids in the catalyst bed when the feed hydrocarbon and $O_2$ concentrations are at their highest (i.e., at the front of the catalyst system). Thus, smaller interstices at the front of the catalyst system minimize the opportunity for the secondary reactions when the feed hydrocarbons and $O_2$ concentrations are high. Therefore, Applicants believe that it is not as critical to have small interstices between the catalyst particles at the back of the catalyst system because much of the feed hydrocarbon and $O_2$ have reacted according to the reaction of Equation 3, and thus, the concentrations of the feed hydrocarbons and the $O_2$ are not as high, and their chance of reacting undesirably is lessened. In addition, because the stream composition at the back end of the reaction zone is different than that at the front end, the use of catalysts other than the catalyst at the front end may be desired and may result in a higher overall conversion of hydrocarbons and selectivity to CO and $H_2$.

DETAILED DESCRIPTION OF THE PREFERRED EMBODIMENTS

Figure 1:
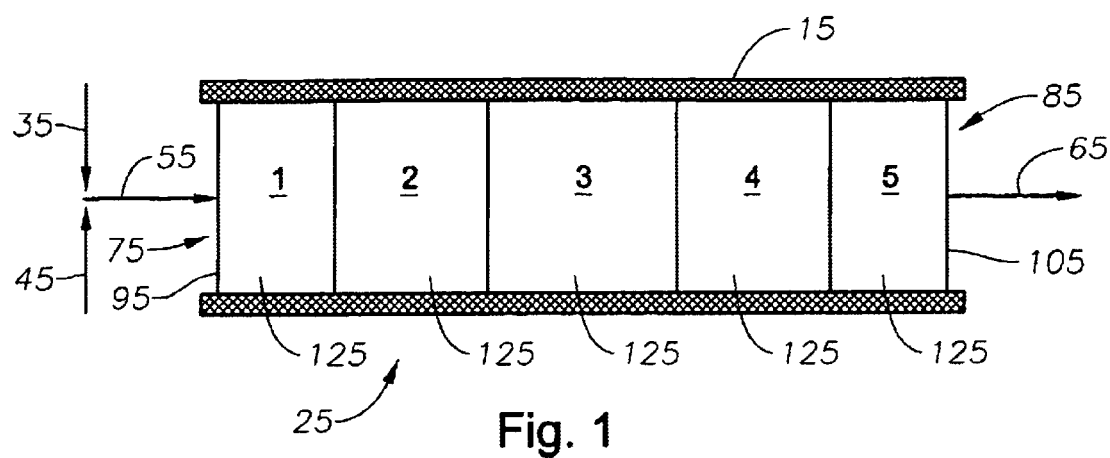
FIG. 1 is a cross sectional schematic of a first reactor in accordance with the present invention.

Referring now to FIG. 1, there is shown a catalyst system in accordance with one embodiment of the present invention. The catalyst bed 125 is contained in a fixed-bed configuration within the catalytic region 25 of a conventional syngas reactor as is known in the art. For example, L. D. Schmidt and his colleagues at the University of Minnesota have described a millisecond contact time reactor for production of synthesis gas by direct oxidation of methane over a catalyst such as platinum, rhodium or nickel (U.S. Pat. No. 5,648,582; 138 J. Catalysis 267–282 (1992); and WO99/35082). A general description of major considerations involved in operating a reactor using millisecond contact times is given in U.S. Pat. No. 6,409,940 to Gaffney et al. and U.S. Pat. No. 5,654,491 to Goetsch et al. The teachings of those references are incorporated herein by reference for all purposes.

Catalytic region 25 comprises generally a feed inlet 75 at the top 95 of catalyst bed 125; a refractory lining 15; stacked zones 1–5; and exit opening 85 at the bottom 105 of bed 125. Within catalyst bed 125 are serially aligned stacked zones 1–5, in which the resistance to gas flow decreases in subsequent zones. Particularly, zone 1, by way of example only, consists of a catalyst and channeled support having a channel density of about 6400–14400 pores per square inch ("ppsi") and zone 5 consists of a catalyst and channeled monolith support having a channel density of about 400–6400 ppsi. Intermediate zones 2, 3, and 4 may include catalysts and supports of declining intermediate channel densities or they may include catalysts and supports of channel densities equal to either of their immediately adjacent neighbors. The channel density of the first zone is preferably at least 5% more than that of the last zone. By way of example only, zones 1–5 may have channel densities of about 6400 ppsi, 6000 ppsi, 5500 ppsi, 5000 ppsi, and 4225 ppsi respectively or channel densities of about 6400 ppsi, 6400 ppsi, 4225 ppsi, 4225 ppsi, and 4225 ppsi respectively. It should be noted that FIG. 1 is not drawn to scale, and the relative and actual size of any of zones 1–5 may vary so long as the overall length of zones 1–5 is preferably greater than or equal to about ⅛ inch (3.18 mm). It is also preferable that the contact time of the reactant gas with the catalyst be no more than about 100 ms, preferably no more than about 10 ms. In an alternative preferred catalyst system configuration, there are two zones instead of 5, zone 1 is ⅜ inch (9.5 mm) long and zone 2 is ⅝ inch (15.9 mm) long. Preferably, the channel density of the zone farthest upstream is at least 6400 ppsi (i.e., the linear channel density is at least 80 pores/inch).

In operation, the hydrocarbon and $O_2$-containing reactant gas mixture is fed into the reactor where it comes into contact with the top 95 of catalyst bed 125. The reactant gas mixture passes over the catalyst bed, which is heated to the point at which the reactant gases start to react and start a net catalytic partial oxidation reaction (defined below), whereby a product gas stream 65, containing mostly CO and $H_2$, exit via opening 85 at the bottom 105 of catalyst bed 125.

In another alternative catalyst system, similar in appearance to that shown in FIG. 1, the flow resistance of the catalyst system (i.e., reaction zones 1, 2, 3, 4, and 5) is a smooth (not necessarily uniform) gradient from the upstream edge of reaction zone 1, 95, to the downstream edge of reaction zone 5, 105.

Preferably natural gas and an $O_2$-containing feedstock are combined to provide the reactant gas mixture. Natural gas, methane, or other hydrocarbons having 2 or greater carbon atoms, and mixtures thereof, also serve as satisfactory feedstocks. The $O_2$ containing feedstock is preferably pure oxygen gas, but it may also be air or $O_2$-enriched air. In addition, the oxygen-containing gas may also comprise steam, $SO_2$, and/or $CO_2$ in addition to oxygen. The reactant gas mixture is fed into a reactor where it comes into contact with the catalyst bed. The reactant gas mixture passes over the catalyst at a gas hourly space velocity of at least about 2000 $hr^{-1}$, which corresponds to a weight hourly space velocity (WHSV) of about 10 $hr^{-1}$, when the reactor is operated to produce synthesis gas. The hydrocarbon feedstock and/or the oxygen-containing gas may be pre-heated before contacting the catalyst. Preferably the reactant gas mixture is pre-heated to a temperature of about 150–700° C., more preferably about 300° C. Catalytically inert porous ceramic foam monoliths (not shown) are preferably placed before and after the catalyst (i.e., upstream of first zone and downstream of last zone) as radiation shields.

The reactant gas mixture passes over the catalyst and the catalytic materials are heated to the point at which the reaction starts. A preferred catalyst system comprises a rhodium/samarium catalyst supported on partially stabilized zirconia ("PSZ") monoliths. Preferably, an autothermal net catalytic partial oxidation reaction ensues, and the reaction conditions are managed so as to promote continuation of the autothermal process. For the purposes of this disclosure, "autothermal" means that after initiation of the reaction, no additional heat must be supplied to the catalyst in order for the production of synthesis gas to continue. Autothermal reaction conditions are promoted by optimizing the concentrations of hydrocarbon and $O_2$ in the reactant gas mixture, preferably within the range of about a 1.5:1 to about 2.3:1 molar ratio of carbon:oxygen. The process preferably includes maintaining a catalyst residence time of no more than about 100 milliseconds, preferably no more than about 10 milliseconds for the reactant gas mixture. This is accomplished by passing the reactant gas mixture over the catalyst at a gas hourly space velocity of about 2,000–100,000,000 $hr^{-1}$, preferably about 50,000–6,000,000 $hr^{-1}$. This range of preferred gas hourly space velocities corresponds to a weight hourly space velocity of about 200 to 60,000 $hr^{-1}$. Under near optimal reaction conditions, a preferred catalyst catalyzes the net partial oxidation of at least 85% of a hydrocarbon feedstock to CO and $H_2$ with a selectivity for CO and $H_2$ products of at least about 85% CO and 85% $H_2$, and a more preferred catalyst catalyzes the net partial oxidation of at least 90% of a hydrocarbon feedstock to CO and $H_2$ with a selectivity for CO and $H_2$ products of at least about 90% CO and 90% $H_2$. Maintaining autothermal reaction promoting conditions may include keeping the temperature of the catalyst at about 600–1,800° C., and preferably between about 600–1,400° C., and maintaining a reactant gas pressure of about 100–12,500 kPa, preferably about 130–10,000 kPa, while contacting the catalyst. Near ideal operating conditions also include mixing a hydrocarbon-containing feedstock and an $O_2$-containing feedstock together in a carbon:oxygen molar ratio of about 1.5:1 to about 2.2:1, and preferably about 2:1. Preferably the hydrocarbon-containing feedstock is at least about 50% methane by volume, more preferably at least 80% methane. Natural gas is mostly methane, but it can also contain up to about 25 mole % ethane, propane, butane and higher hydrocarbons. The new syngas generation process is suitable for the conversion of gas from naturally occurring reserves of methane, which can also contain carbon dioxide, nitrogen, hydrogen sulfide, and other minor components. The product gas mixture emerging from the catalyst bed preferably has the desired Fischer-Tropsch syngas feed $H_2$:CO ratio of 2:1.

Figure 2:
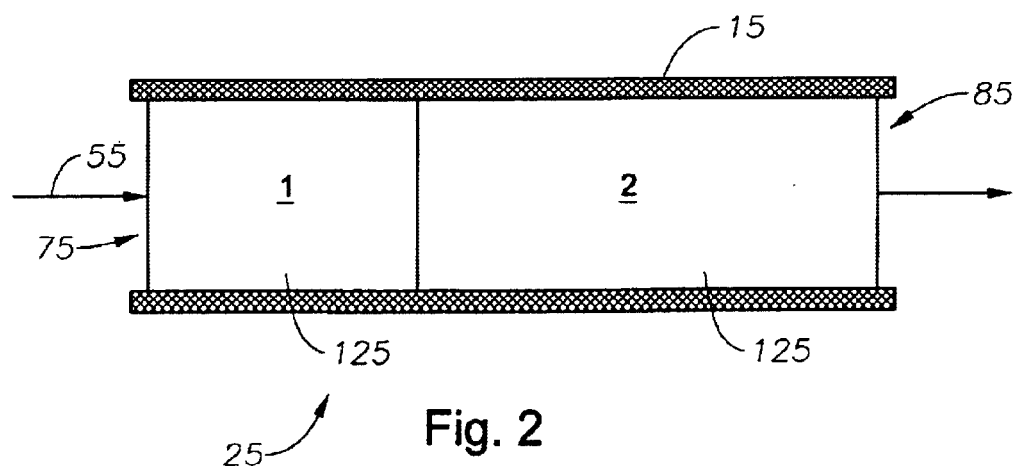
FIG. 2 is a cross-sectional schematic of a second reactor in accordance with the present invention.

Referring now to FIG. 2, there is shown a basic catalyst system in accordance with one embodiment of the present invention. The catalyst bed 125 is contained in a fixed-bed configuration within the catalytic region 25 of a conventional syngas reactor as is known in the art.

Catalytic region 25 comprises generally a feed inlet 75 at the top of catalyst bed 125; a refractory lining 15; stacked zones 1 and 2; and exit opening 85 at the bottom 105 of bed 125. Within catalyst bed 125 are serially aligned stacked zones 1 and 2 in which the resistance to gas flow of zone 2 is less than the resistance to gas flow of reaction zone 1.

Although in the preferred embodiment, zone 1 comprises a channeled monolith support having a channel density of 6400 ppsi (80 pores per linear inch) and zone 2 comprises a channeled monolith support having a channel density of 4225 ppsi (65 pores per linear inch), any embodiment in which serially aligned stacked zones having overall decreasing resistance to flow are considered to be within the scope of the present invention, so long as the desired reactor conditions (i.e., gas hour space velocity greater than or equal to about 2000 $hr^{-1}$; contact time less than or equal to about 100 ms) can be achieved. It is contemplated that one of ordinary skill in the art can easily modify existing catalyst systems in accordance with the present invention to achieve the desired reactor conditions.

EXAMPLE

Procedure for Preparation of Rh/Sm/PSZ Catalysts

An aqueous solution of samarium nitrate [$Sm(NO_3)_3$] was added dropwise to saturate a PSZ monolith. Suitable PSZ monoliths about 10 or 15 mm long and 12 mm diameter are commercially available from well known sources. The monolith was situated on a Teflon® plate residing on a warm (75° C.) hotplate. The entire samarium salt solution was gradually added to the monolith, allowing the water to evaporate between saturations. The dried monolith was then calcined in air (static or flowing) according to the following program: heat from room temperature (RT) to about 125° C. at a rate of about 5° C./min, dwell at that temperature for about 60 min (extra drying step); heat from about 125° C. to about 400–900° C., preferably about 600° C., at a rate of about 1–10° C./min, preferably about 5° C./min, dwell at that temperature for about 120–360 min, or more, preferably about 240 min.

An aqueous solution of rhodium chloride [$RhCl_3 \cdot xH_2O$] was added dropwise to saturate the Sm coated PSZ monolith, prepared as described in the above paragraph. The Rh salt solution was gradually added to the monolith, allowing the water to evaporate between saturations. The dried monolith was then calcined in air flowing at about 0.1–1 NLPM (normal liters per minute), or more, but preferably about 0.4 NLPM, according to the following program: heating from room temperature (RT) to about 125° C. at a rate of increase of about 5° C./min, dwell for 60 min at about 125° C. (extra drying step); heat from about 125° C. to about 400–900° C., preferably about 600° C. at a rate of increase of about 1 to 10° C./min, preferably about 5° C./min, dwell for about 120 to 360 min, or more, preferably about 240 min at that temperature.

This final calcined Rh/Sm/PSZ monolith catalyst was then reduced in flowing $H_2$ (or $H_2/N_2$ mixture) at a flow rate of about 0.1–1 NLPM, or more, preferably about 0.6 NLPM, while applying heat according to the following program: heat from room temperature (RT) to about 125° C. at a rate of temperature increase of 5° C./min, dwell for about 30 min at that temperature (extra drying step); heat from about 125° C. to about 300 to 900° C., preferably about 400° C., at a rat of increase of about 1 to 10° C./min, preferably about 5° C./min, dwell at that temperature for about 60–360 min, or more, preferably about 180 min. The concentrations of the Sm and Rh solutions and the amounts loaded onto the PSZ monolith were chosen so as to provide the final wt % of 5.01% Sm and 4.09% Rh.

Test Procedure

The partial oxidation reactions were carried out in a conventional flow apparatus using a 44 mm O.D.×38 mm I.D. quartz insert embedded inside a refractory-lined steel vessel. The quartz insert contained a catalyst bed containing at least one porous monolith catalyst (~37 mm O.D.×10–15 mm high) held between two foam disks. The upper foam disk typically consisted of 65-ppi partially-stabilized zirconia and the bottom foam disk typically consisted of 30-ppi zirconia-toughened alumina. Preheating the methane or natural gas that flowed through the catalyst bed provided the heat needed to start the reaction. Oxygen was mixed with the methane or natural gas immediately before the mixture entered the catalyst bed. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the parameters being evaluated. The product gas mixture was analyzed for $CH_4$, $O_2$, CO, $H_2$, $CO_2$ and $N_2$ using a gas chromatograph equipped with a thermal conductivity detector. A gas chromatograph equipped with a flame ionization detector analyzed the gas mixture for $CH_4$, $C_2H_6$, $C_2H_4$ and $C_2H_2$. The $CH_4$ conversion levels and the CO and $H_2$ product selectivities obtained for each catalyst monolith evaluated in this test system are considered predictive of the conversion and selectivities that will be obtained when the same catalyst is employed in a commercial scale short contact time reactor under similar conditions of reactant concentrations, temperature, reactant gas pressure and space velocity.

Figure 3:
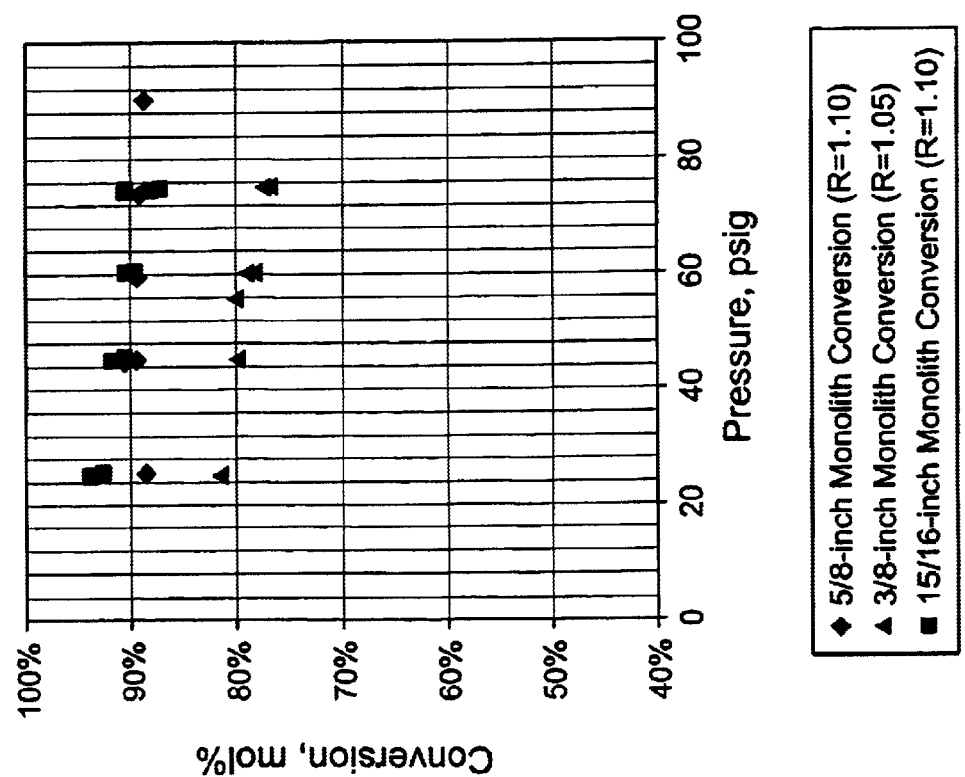
FIG. 3 is a graph showing the carbon conversion activity (y-axis) at various gas pressures (x-axis) obtained using ⅜" (9.5 mm), ⅝" (15.9 mm), and ¹⁵⁄₁₆" (23.8) long Samarium-containing monolith catalysts tested under similar conditions. "R" is the ratio of oxygen to fuel calculated on a mass basis.

The graph in FIG. 3 shows the higher methane conversion levels obtained with a 15/16" or a 5/8" monolith catalyst than with a shorter (3/8") monolith catalyst when evaluated at reactant gas pressures of 20, 40, 60, 75 and 90 psig (238, 476, 513, 616, 719 kPa). Even after correcting the data for the greater total amount of Sm and Rh contained in the 15 mm and the 24 mm beds, the conversion level is significantly higher for the longer monoliths, as demonstrated in FIG. 3. This data suggests that improved performance synthesis gas catalysts are obtained by using longer monolith catalyst beds.

Figure 4:
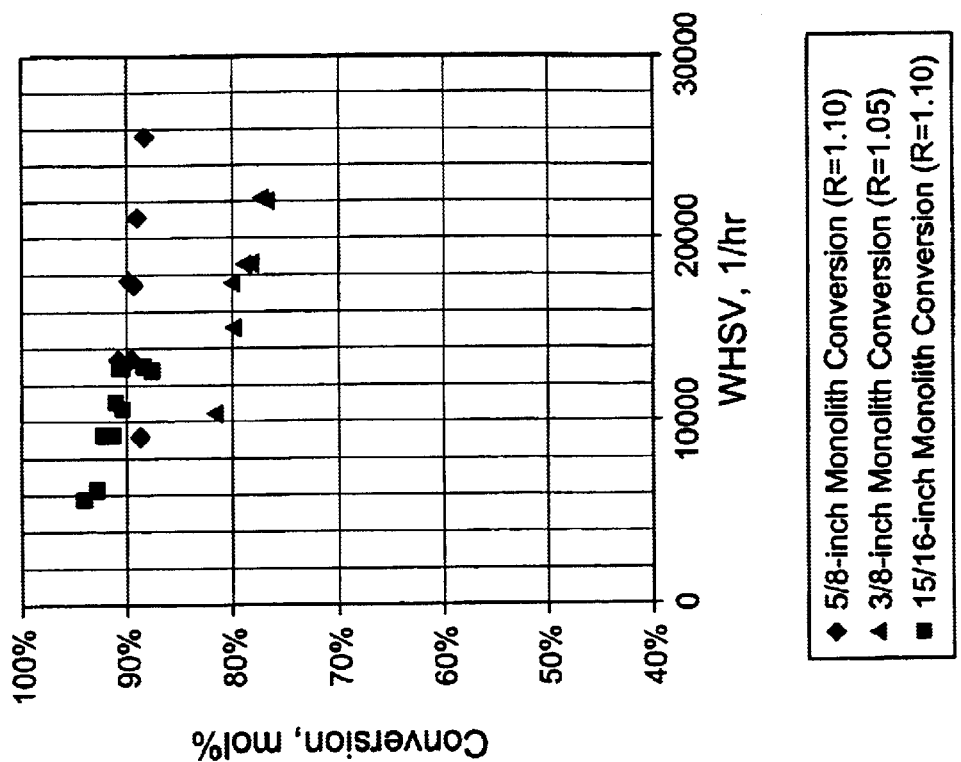
FIG. 4 is a graph showing the carbon conversion activities of FIG. 3 at various weight hourly space velocities (g fuel/g catalyst/hour). "R" is the ratio of oxygen to fuel in the feed calculated on a mass basis.

FIG. 4 is a graph of the same data as in FIG. 3, except that it presents the carbon conversion activity of each monolith catalyst relative to the corresponding weight hourly space velocity. Weight hourly space velocities (WHSV) ranged from about 6000 to 26,000 grams of $CH_4$ fed to the reactor per gram of monolith catalyst per hour. In these tests the ratio of $CH_4:O_2$ in the reactant gas mixture was adjusted slightly for the 5/8" (15.9 mm) and the 15/16" (23.8 mm) monoliths (i.e., from R=1.05 for the 3/8" (9.6 mm) monolith to R=1.10 for the 5/8" (15.9 mm) and 15/16" (23.8 mm) monoliths), in order to keep the run temperature in each case at no more than 1150° C.

A Rh/Sm/PSZ catalyst system was prepared as set forth above, and three pilot plant tests were run according to the test procedure above at the conditions set forth in Table 1.

In the first run, the reactant gas at a pressure of 45 psig and a temperature of 300° C. was injected across a 3/8 inch (9.6 mm) catalyst with a channel density of 6400 ppsi. The second run was operated at conditions similar to the first run, except that a 5/8 inch (15.9 mm) length of catalyst was added to the catalyst system. For the third run, the pressure was increased to 60 psig (513 kPa). The new 5/8 inch (15.9 mm) catalyst added for the second and third runs was of the same composition as the first 3/8 inch (9.6 mm), except that the new 5/8 inch (15.9 mm) had a channel density of 4225 ppsi. As can be seen from Table 1, the longer catalyst beds with a graded porosity had a higher methane conversion as well as a higher selectivity to the desired CO and $H_2$ products, even at higher pressures.

TABLE 1

|  | Pressure psig | Temp. ° C. | $CH_4$ Conversion % | CO Selectivity % | $H_2$ Selectivity % | $C_2H_4$ Selectivity % | $O_2/CH_4$ Ratio |
|---|---|---|---|---|---|---|---|
| 3/8" Length (6400 ppsi) | 45 | 941 | 74 | 76 | 57 | 7 | 1.03 |
| 3/8" + 5/8" Length (6400 ppsi) + (4225 ppsi) | 45 | 955 | 90 | 94 | 90 | less than 1 | 1.05 |
| 3/8" + 5/8" | 60 | 1000 | 90 | 94 | 89 | 1 | 1.04 |

TABLE 1-continued

| | Pressure psig | Temp. °C. | CH$_4$ Conversion % | CO Selectivity % | H$_2$ Selectivity % | C$_2$H$_4$ Selectivity % | O$_2$/CH$_4$ Ratio |
|---|---|---|---|---|---|---|---|
| Length (6400 ppsi) + (4225 ppsi) | | | | | | | |

For the purposes of this specification, the following definitions shall apply.

The term "porosity" shall be defined as the ratio of the void volume of a material to the overall volume of the material.

The term "pore density" is the measure of the number of pores in a given space. In two-dimensions, the pore density is found by dividing the number of pores on a surface by the area of the surface (e.g., pores/square inch).

The terms "catalyst system" and "catalyst bed" as used herein means any acceptable system for catalyzing the desired reaction in the reaction zone. By way of example only, the catalyst system of a hydrocarbon catalytic partial oxidation reaction usually includes a support and a catalyst. The support may be, for example, particulates, pills, beads, granules, pellets, rings, monoliths, ceramic honeycomb structures, wire gauze, or any other suitable supports in any acceptable manufactured shape such as those listed herein. Additionally, multiple supports may be used; for example, one zone may contain one support and another zone may contain a different type or composition support. The catalyst may be selected from the group consisting of nickel, samarium, rhodium, cobalt, platinum, rhodium-samarium, platinum-rhodium Ni—MgO, Group VIII metals, combinations thereof, or any other catalysts mentioned herein or as is well known in the art. Like with the supports, multiple catalysts may be used; for example one zone may comprise one catalyst and another zone may comprise a second different catalyst. The above-exemplified examples of supports and catalysts are only examples. There are a plethora of catalysts systems known in the art which would be acceptable and are contemplated to fall within the scope, such as those disclosed in U.S. Pat. No. 5,510,056 to Jacobs, et al. and STRUCTURED CATALYSTS AND REACTORS 179–208, 599–615 (Andrzej Cybulski and Jacob A. Moulijn eds. 1998), incorporated herein by reference for all purposes.

The term "channel density" is the measure of the number of channel openings in a given area. The channel density is found by dividing the number of channel openings on a surface by the area of the surface. If the channels are linearly aligned, a one-dimensional channel density may be called the "linear channel density" and given in channels per linear inch.

The term "flow resistance" is generally a porous material's impedance to flow. For example, more force is necessary to push a fluid through a catalyst bed of very small very densely packed spheres than through the same size catalyst bed comprising large loosely packed spheres. Thus, the bed of very small very densely packed spheres has a greater flow resistance.

As used herein, the term "syngas catalyst" means a catalyst which catalyzes the net partial oxidation of a hydrocarbon to produce syngas. By way of example only, the rhodium-samarium catalysts as disclosed herein to catalyze the production of syngas from a feedstream of methane and oxygen may be called a syngas catalyst.

For the purposes of this disclosure, the term "net partial oxidation reaction" means that the partial oxidation reaction shown in Equation (3), above, predominates. However, other reactions such as steam reforming (see Equation 1), dry reforming (Equation (2)) and/or water-gas shift (Equation (4)) may also occur to a lesser extent.

$$CH_4 + CO_2 \leftrightarrows 2CO + 2H_2 \qquad (2)$$

$$CO + H_2O \leftrightarrows CO_2 + H_2 \qquad (4)$$

The relative amounts of the CO and H$_2$ in the reaction product mixture resulting from the catalytic net partial oxidation of the methane, or natural gas, and oxygen feed mixture are about 2:1 H$_2$:CO, similar to the stoichiometric amounts produced in the partial oxidation reaction of Equation (3).

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

Should the disclosure of any of the patents and publications that are incorporated herein by reference conflict with the present specification to the extent that it might render a term unclear, the present specification shall take precedence.

What is claimed is:

1. A method for catalyzing the net partial oxidation of a feed stream of hydrocarbons and an oxygen containing gas to produce a product gas, the method comprising:
   providing a plurality of serially aligned stacked zones having at least a first zone and a final zone;
   providing a catalyst support within each zone;
   providing a catalyst on each catalyst support; and
   feeding the feed stream through the serially aligned stacked zones;
   wherein the first zone has a first flow resistance;
   wherein each subsequent zone has a flow resistance which is less than or equal to about the flow resistance of the previous zone; and
   wherein the final reaction zone has a flow resistance less than the first reaction zone.

2. The method of claim 1 wherein the hydrocarbon is primarily methane.

3. The method of claim 1 wherein the catalyst support is selected from the group consisting of pills, pellets, monoliths, particulates, spheres, beads, granules, rings, extrudates, ceramic honeycomb structures, and wire gauze.

4. The method of claim 1 wherein the catalyst support comprises a manufactured shape or form.

5. The method of claim 1 wherein the catalyst support comprises a material selected from the group consisting of magnesium stabilized zirconia, zirconia stabilized alumina, yttrium stabilized zirconia, calcium stabilized zirconia, alumina, cordierite, zirconia, titania, silica, and silicon carbide.

6. The method of claim 1 wherein the catalyst is selected from the group consisting of Rh, Pt, Pd, Ru, Lr, Re, Ni, Co, Fe, Mn, Cr, Mg, Ca, Y, La, Ce, Sm, Yb, Pr, and combinations thereof.

7. The method of claim 1 wherein each catalyst support is a magnesium stabilized zirconia monolith.

8. The method of claim 1 wherein at least one catalyst is a Group VIII metal.

9. The method of claim 1 wherein at least one of the catalysts comprises Rh.

10. The method of claim 1 wherein at least one of the catalyst is Ni-based.

11. The method of claim 1 wherein the first flow resistance is at least 5% greater than the resistance of the final reaction zone.

12. The method of claim 1 wherein the feed stream is fed through the serially aligned stacked reaction zones at a gas hourly space velocity of at least about 2,000 $hr^{-1}$.

13. The method of claim 1 wherein the feed stream has a contact time with the catalyst and wherein the combined contact time with the catalyst is less than about 100 ms.

14. The method of claim 1 wherein the feed stream has a contact time with the catalyst and wherein the combined contact time with the catalyst is less than about 10 ms.

15. A method for catalyzing the net partial oxidation of a feed stream comprising hydrocarbons and an oxygen containing gas to produce a product gas, such as syngas, the method comprising:
  providing a first zone;
  providing a stacked second zone serially aligned with said first zone;
  providing a first catalyst support having a first flow resistance in the first zone and a second catalyst support having a second flow resistance in the second zone, wherein the first flow resistance is greater than the second flow resistance;
  supporting a first catalyst on the first catalyst support and a second catalyst on the second catalyst support;
  feeding the feed stream through the first reaction zone; and
  feeding the feed stream through the second reaction zone.

16. The method of claim 15 wherein the first flow resistance is at least 5% greater than the second flow resistance.

17. The method of claim 15 wherein the first and second supports are monoliths.

18. The method of claim 15 wherein one of the catalyst supports is a monolith.

19. The method of claim 15 wherein the first and second catalyst supports are both channeled monoliths.

20. The method of claim 15 wherein one of the catalyst supports is granular.

21. The method of claim 15 wherein the first and second catalyst supports are both granular.

22. The method of claim 15 wherein the first and second catalysts are substantially the same composition.

23. The method of claim 15 wherein the first and second catalysts have substantially different compositions.

24. A process for the production of synthesis gas, the method comprising:
  contacting a hydrocarbon-containing gas and an oxygen-containing gas with a syngas catalyst system so as to partially oxidize at least a portion of the hydrocarbon, wherein the catalyst system comprises:
  providing a plurality of serially aligned stacked zones having at least a first zone and a final zone;
  providing a catalyst support within each zone;
  providing a catalyst on each catalyst support; and
  feeding the feed stream through the serially aligned stacked zones;
  wherein the first zone has a first flow resistance;
  wherein each subsequent zone has a flow resistance which is less than or equal to about the flow resistance of the previous zone; and
  wherein the final reaction zone has a flow resistance less than the first reaction zone.

25. The method of claim 24 wherein the hydrocarbon is primarily methane.

26. The method of claim 24 wherein the catalyst support is selected from the group consisting of pills, pellets, monoliths, particulates, spheres, beads, granules, rings, extrudates, ceramic honeycomb structures, and wire gauze.

27. The method of claim 24 wherein the catalyst support comprises a manufactured shape or form.

28. The method of claim 24 wherein the catalyst support comprises a material selected from the group consisting of magnesium stabilized zirconia, zirconia stabilized alumina, yttrium stabilized zirconia, calcium stabilized zirconia, alumina, cordierite, zirconia, titania, silica, and silicon carbide.

29. The method of claim 24 wherein the catalyst is selected from the group consisting of Rh, Pt, Pd, Ru, Lr, Re, Ni, Co, Fe, Mn, Cr, Mg, Ca, Y, La, Ce, Sm, Yb, Pr, and combinations thereof.

30. The method of claim 24 wherein each catalyst support is a magnesium stablized zirconia monolith.

31. The method of claim 24 wherein at least one catalyst is a Group VIII metal.

32. The method of claim 24 wherein at least one of the catalysts comprises Rh.

33. The method of claim 24 wherein at least one of the catalyst is Ni-based.

34. The method of claim 24 wherein the first flow resistance is at least 5% greater than the resistance of the final reaction zone.

35. The method of claim 24 wherein the feed stream is fed through the serially aligned stacked reaction zones at a gas hourly space velocity of at least about 2000 $hr^{-1}$.

36. The method of claim 24 wherein the feed stream has a contact time with the catalyst and wherein the combined contact time with the catalyst is less than about 100 ms.

37. The method of claim 24 wherein the feed stream has a contact time with the catalyst and wherein the combined contact time with the catalyst is less than about 10 ms.

* * * * *